United States Patent Office 3,718,847
Patented Feb. 27, 1973

3,718,847
ADJUSTABLE SPEED POLYPHASE A-C MOTOR DRIVE UTILIZING AN IN-PHASE CURRENT SIGNAL FOR MOTOR CONTROL
Carlton Eugene Graf and Einar Aasen Skogsholm, Erie, and Werner Karl Volkmann, Fairview, Pa., assignors to General Electric Company
Filed May 28, 1971, Ser. No. 147,771
Int. Cl. H02p 5/40
U.S. Cl. 318—227                                    5 Claims

ABSTRACT OF THE DISCLOSURE

The current and voltage to each phase of an A-C motor are sensed and utilized to produce a phase control signal having an average value proportional to the average magnitude of the in-phase current within that phase. The phase control signals are summed to produce a composite signal indicative of certain motor operating characteristics, including slip and torque, the composite control signal being supplied to the control of an inverter which produces variable frequency alternating current electric power for driving the A-C motor. In response to variations in the composite control signal, the fundamental frequency and the average voltage of the alternating current power are adjusted by the control.

BACKGROUND OF THE INVENTION

Field of the invention

This invention relates to variable speed electric drives of the kind wherein a polyphase A-C motor is supplied with variable frequency, variable voltage power to produce variable speed operation of the motor and, more particularly, to the control of such drives through the use of signals proportional to the in-phase motor current.

Description of the prior art

This invention is particularly applicable to the control of drive systems of the general type disclosed and claimed by copending patent application Ser. No. 81,758, entitled "Adjustable Speed Polyphase A-C Motor Drive," filed on Oct. 19, 1970, in the names of Carlton E. Graf and Werner K. Volkmann, and by copending patent application Ser. No. 81,757, entitled "Synchronous Time Ratio Control Power Regulator," filed on Oct. 19, 1970, in the name of Carlton E. Graf, both application being assigned to the assignee of this invention. While the present invention will be described herein in connection with a drive system of the type taught by the aforesaid patent applications to the extent necessary for a full and complete understanding of the invention, a more complete understanding of such inverter circuits may be obtained from the aforesaid patent applications.

It is known that variable speed operation of polyphase A-C motors can be accomplished by providing an adjustable frequency polyphase voltage to such motors. It is similarly known that the average voltage applied to the motor under such circumstances is advantageously correspondingly varied to provide a substantially constant voltage-to-frequeny ratio. It is likewise known that one means for varying the average voltage is to time-ratio-control (TRC) switch the A-C voltage supplied to the motor. With such control, the average voltage is determined by the ratio of "on" to "off" periods during a given half-cycle of power. The aforesaid patent applications relate to adjustable speed drive systems in which adjustable polyphase voltage is supplied in this manner.

It is also well known that the speed of an induction motor varies from synchronous speed by an amount which varies with torque, or load, the speed difference being known as "slip." Unless compensated for, an increase in load on an induction motor will cause a reduction in motor speed, thus increasing slip, and a decrease in load will result in increased motor speed and reduced slip. In many applications of drive systems, a constant or substantially constant motor speed over a wide range of load conditions is not only desirable, but also essential. In such drive systems, effective speed regulation must be provided for acceptable operation of the drive system. Since the speed of an induction motor can be increased by increasing the fundametal frequency of the alternating current power supplied to the motor and decreased by decreasing the fundamental frequency, speed regulation can be provided by sensing slip and compensating for changes in slip by increasing or decreasing the fundamental frequency.

It is also desirable that the excitation voltage in an induction motor be maintained constant and undisturbed by changes in load at a given frequency, excitation voltage being the voltage applied at the motor terminals less the reactive losses within the motor. Unless compensated for, the effect of stator impedance is to reduce excitation voltage with increasing load and to increase excitation voltage with decreasing load. The excitation voltage can be maintained constant by sensing changes in load, or torque, and adjusting terminal voltage accordingly.

SUMMARY OF THE INVENTION

Accordingly, it is a primary object of this invention to provide improved means for sensing changes in the slip of an induction motor in an adjustable speed drive system and compensating therefore to maintain a substantially constant operating speed.

Another object is to provide improved means responsive to the load on an induction motor in an adjustable speed drive system for maintaining substantially constant excitation voltage.

Another object of this invention is to provide the foregoing objects by exclusively electrical means.

Yet another object of this invention is to attain the foregoing objects in a drive system of the type taught by the aforesaid patent applications without adversely affecting the mode of drive system operation taught herein.

A further object is to provide the foregoing objects throughout the normal operational range of the drive system, including both motoring and regenerative operation.

A still further object is to provide the foregoing objects in a relative simple and inexpensive manner.

Briefly stated, in carrying out the invention in one form, an A-C adjustable speed drive system including a polyphase motor and static power conversion apparatus for producing variable frequency output A-C polyphase power is provided with means for sensing in each motor phase the actual current and the phase voltage and producing, whenever the voltage is of a predetermined polarity, a continuous phase control signal, the magnitude of the phase control signal at any instant during its generation being proportional to the magnitude of the actual phase current at that particular instant and the average magnitude of the phase control signal being proportional to the average magnitude of the component of actual current which is in phase with the phase voltage. The various phase control signals are summed to produce a composite control signal indicative of motor torque and slip, and the composite control signal is utilized by the control means for the power conversion apparatus to vary the voltage output of the power conversion apparatus in response to variations in the composite control signal. By a further aspect of the invention, the control means is responsive to a command signal and at least the composite control signal to generate a corrected control signal and is responsive thereto to maintain a substantially constant motor speed, in the presence of a constant command signal, by varying the fundamental frequency of the power output of the power conversion apparatus. By a still further aspect of the invention, the control means is responsive to the composite control signal to increase the average voltage with increasing load and to decrease the average voltage with decreasing load, the excitation voltage thus being maintained substantially constant and independent of load at any given frequency.

In accordance with still further aspects of the invention, each of the phase control signal producing means includes at least one bi-directional conductive path between an input connected to receive a signal proportional to actual current and an output connected to supply the phase control signal to a summing device, the conductance of the path being controlled by a signal in phase with the voltage of the respective phase supplied to a control input. More particularly, the bi-directional conductive path is conductive only when the voltage signal has a predetermined polarity. In this manner, the actual current signal is transmitted to the summing device as the phase control signal during periods of high conductance. In a preferred embodiment of the invention, the phase control signal producing means is a single field effect transistor in which the gate of the transistor is the control input means.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings wherein like parts in each of the several figures are identified by the same reference character and in which:

DETAILED DESCRIPTION

Figure 1:
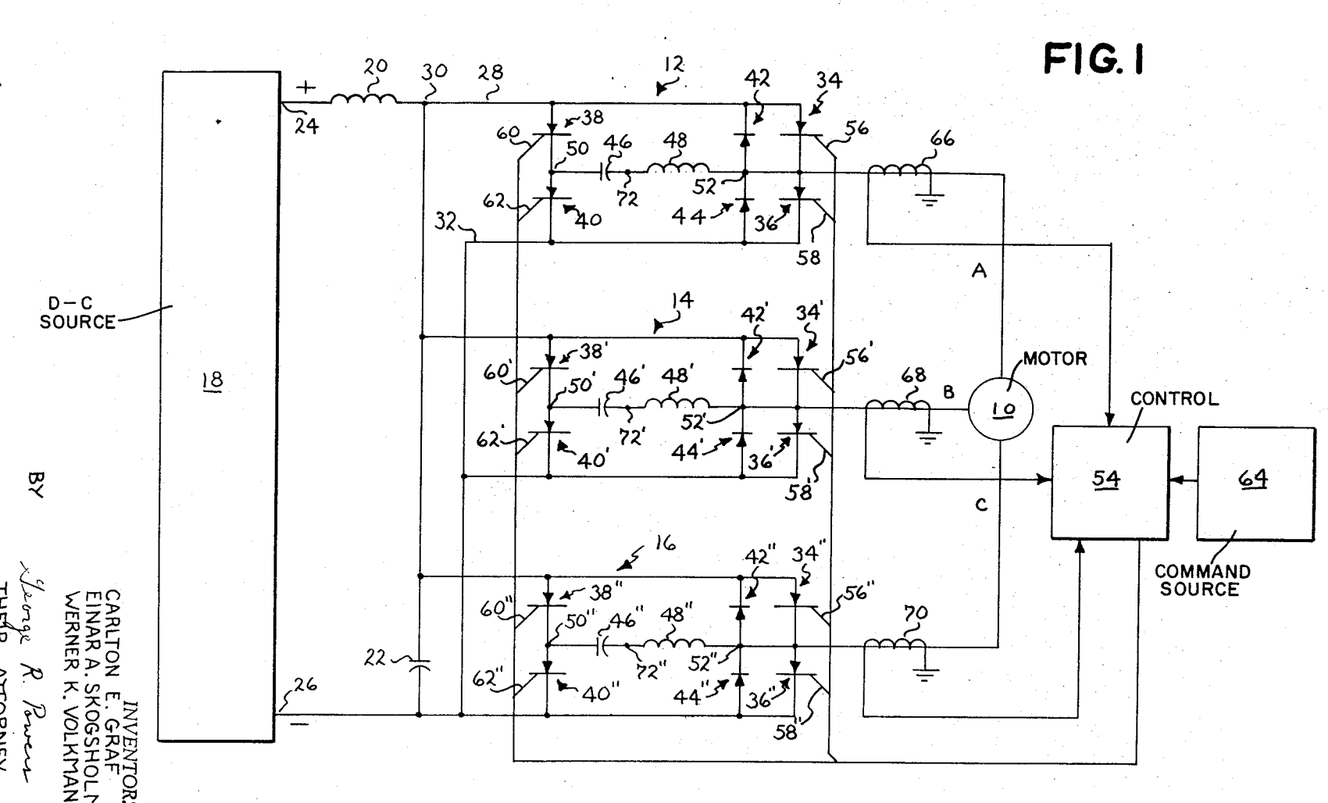
FIG. 1 is a schematic circuit diagram of an A-C adjustable speed drive system incorporating the present invention.

Referring first to FIG. 1, a three-phase adjustable speed drive system of the type disclosed by the aforesaid patent applications is illlustrated, the drive system including a three-phase induction motor 10 having phases A, B and C supplied with alternating current electric power from power conversions apparatus including single phase, full wave inverter circuits 12, 14 and 16. Each of the inverter circuits 12, 14 and 16 inverts direct current electric power from a D-C source 18 to the alternating current power supplied to the motor 10. Any convenient source of D-C electrical power may be used, such as a battery or a rectifying device for converting A-C input power to unidirectional output power. To attenuate ripple and provide a low impedance D-C source, a filter is provided, the filter comprising an inductor 20 connected to the positive terminal 24 of the D-C source 18 and a capacitor 22 connected to the inductor 20 at 30 and to the negative terminal 26 of the D-C source 18. It will occur to those skilled in the art that the power conversion apparatus could alternately be utilized to convert alternating input electric power to output alternating electric power of a different frequency.

The inverter circuit 12 for Phase A includes a positive bus 28 connected to the electrical junction 30 between the inductor 20 and the capacitor 22 and a negative bus 32 connected to the negative terminal 26 of the D-C source 18. The inverter circuit 12 includes a pair of load current gate controlled rectifiers 34 and 36 connected in series between the positive bus 28 and the negative bus 32 with the anode of rectifier 34 connected to the positive bus 28. Gate controlled rectifiers 38 and 40 are also connected in series between the buses 28 and 32 with the same polarity as the gate controlled rectifiers 34 and 36. The gate controlled rectifiers 34, 36, 38 and 40 are preferably silicon controlled rectifiers, but it will be obvious that functionally equivalent devices such as gaseous thyratrons can be used. Diode rectifiers 42 and 44 are connected in parallel across the controlled rectifiers 24 and 36, respectively, in reverse polarity, and an inductance 46 and a capacitor 48 are connected in series between the junction 50 of the gate controlled rectifiers 38 and 40 and the junction 52 of the gate controlled rectifiers 34 and 36 and the diode rectifiers 42 and 44. Phase A of the induction motor 10 is connected to the junction 52 for receiving alternating current from the inverter circuit 12.

Inverter circuits 14 and 16 for supplying alternating current to Phases B and C, respectively, are identical in physical structure and mode of connection to the D-C source 10 to the inverter circuit 12. Accordingly, like elements in circuit 14 are indicated by primed numerals and like elements in circuit 16 are indicated by double primed numerals.

As illustrated by FIG. 1, control apparatus 54 is provided for turning on the gate controlled rectifiers 34, 36, 38 and 40 of the inverter circuit of Phase A by means of firing signal pulses supplied through connections 56, 58, 60 and 62, respectively. Similar signal pulses are also supplied through appropriate connections to the gate controlled rectifiers of the circuits 14 and 16. The control apparatus 54 is responsive to various input signals including a command signal from a command source 64, the command signal indicating a desired level of output performance, specifically motor speed. In accordance with this invention, the control apparatus 54 also receives signals proportional to the actual current flow in each of the motor phases, these signals being conveniently generated as illustrated by FIG. 1 by current transformers 66, 68 and 70 connected to monitor actual current flow in Phases A, B and C, respectively. A detailed description of the control apparatus 54 is set forth below.

Before turning attention to the control apparatus of this invention, the general mode of operation of the drive system of FIG. 1 will be described. It should be borne in mind that the function of the inverter circuits 12, 14 and 16 is to transform D-C power from the source 18 to A-C power for delivery through Phases A, B and C to the motor 10. To accomplish this in Phase A, the gate controlled rectifier 34 and the gate controlled rectifier 36 of circuit 12 conduct alternately for time periods established by the control apparatus 54. The fundamental frequency at which changes in conduction occur is controlled by the control apparatus 54 and firing signal pulses which it supplies to the gate controlled rectifiers of the circuit 12. The manner in which conduction is varied is known as commutation and now will be described briefly with respect to Phase A and the inverter circuit 12.

Initially, let it be assumed that the main controlled rectifier 34 is conducting current to the motor 10. As a result of previous operation, the capacitor 46 is charged such that a point 72 between the capacitor 46 and the inductor 48 is positive in potential with respect to the junction 50. To commutate the controlled rectifier 34 "off," the commutating controlled rectifier 38 is turned "on," as by receiving a firing signal pulse from the control apparatus through connection 60. A series oscillatory circuit comprising the commutating capacitor 46 and the commutating inductor 48 is now connected across the load current carrying controlled rectifier 34. A current pulse produced by the discharging series oscillatory circuit takes over the function of supplying load current to the motor 10 and causes the diode 42 to be forward biased. As a result, the current through the controlled rectifier 34 is reduced to zero. The feedback diode 42 conducts excess commutation current around the controlled rectifier 34 and provides a limited reverse bias across the controlled rectifier 34. This reverse bias lasts for a period greater than the turn-off time of the controlled rectifier 34 so that this controlled rectifier is caused to turn "off," i.e., to regain its blocking mode of operation.

After the commutating capacitor 46 has been charged to the opposite polarity, so that the junction 50 is more positive in potential than the positive bus 28, the commutating controlled rectifier 38 turns off. Since the controlled rectifier 34 is now turned off, reactive current circulates through the opposite feedback diode 44. The main controlled rectifier 36 can be fired at this time by applying a firing signal to its gate electrode through connection 58. The commutating capacitor 46 thereafter has the appropriate polarity to commutate "off" this controlled rectifier when the commutating controlled rectifier 40 is turned on. After the controlled rectifiers 36 and 40 are turned "off" to thus complete a full cycle of 360 electrical degrees, the controlled rectifier 34 is turned "on" and the capacitor 46 is charged to the same polarity as it was at the start of the commutation interval. This general type of commutation of inverter circuits is disclosed in greater detail by United States Pat. No. 3,207,974 to McMurray, dated Sept. 21, 1965, and assigned to the assignee of this invention.

It will, of course, readily occur to those skilled in the art that the conduction of the gate controlled rectifiers 34' and 36' of circuit 14 and the gate controlled rectifiers 34" and 36" are controlled in the same manner by firing signal pulses supplied thereto from the control apparatus 54 over the appropriate connections. The alternating current thus supplied to Phases B and C by the inverter circuits 14 and 15, respectively, has the same frequency as the alternating current electric power supplied to Phase A, but the wave forms supplied to the three phases are displaced from one another in time by 120 electrical degrees as is customary in three-phase systems.

In addition to controlling the fundamental frequency at which the alternating current power is supplied to the induction motor 10, the control apparatus 54 includes means as taught by the aforesaid copending patent applications to control the average voltage by means of time-ratio-controlled switching of the gate controlled rectifiers of the circuits 12, 14 and 16. More particularly, operation in the manner described above results at any selected point in time in two phases being connected to one potential of the D-C supply and the other phase being connnected to the other potential of the D-C supply. For example, at a selected period in time, rectifiers 34 and 34' may be conducting from positive buses 28 and 28' while rectifier 36" is conducting to negative bus 32". At another period in time, rectifier 34' may be conductive from positive bus 28' while rectifiers 36 and 36" are conducting to negative buses 32 and 32". As taught in the aforesaid applications, the gate controlled rectifiers of the sole circuit connected to one of the potentials are switched in a time-ratio-controlled manner at a switching frequency substantially higher than that of the fundamental frequency.

Figure 2:
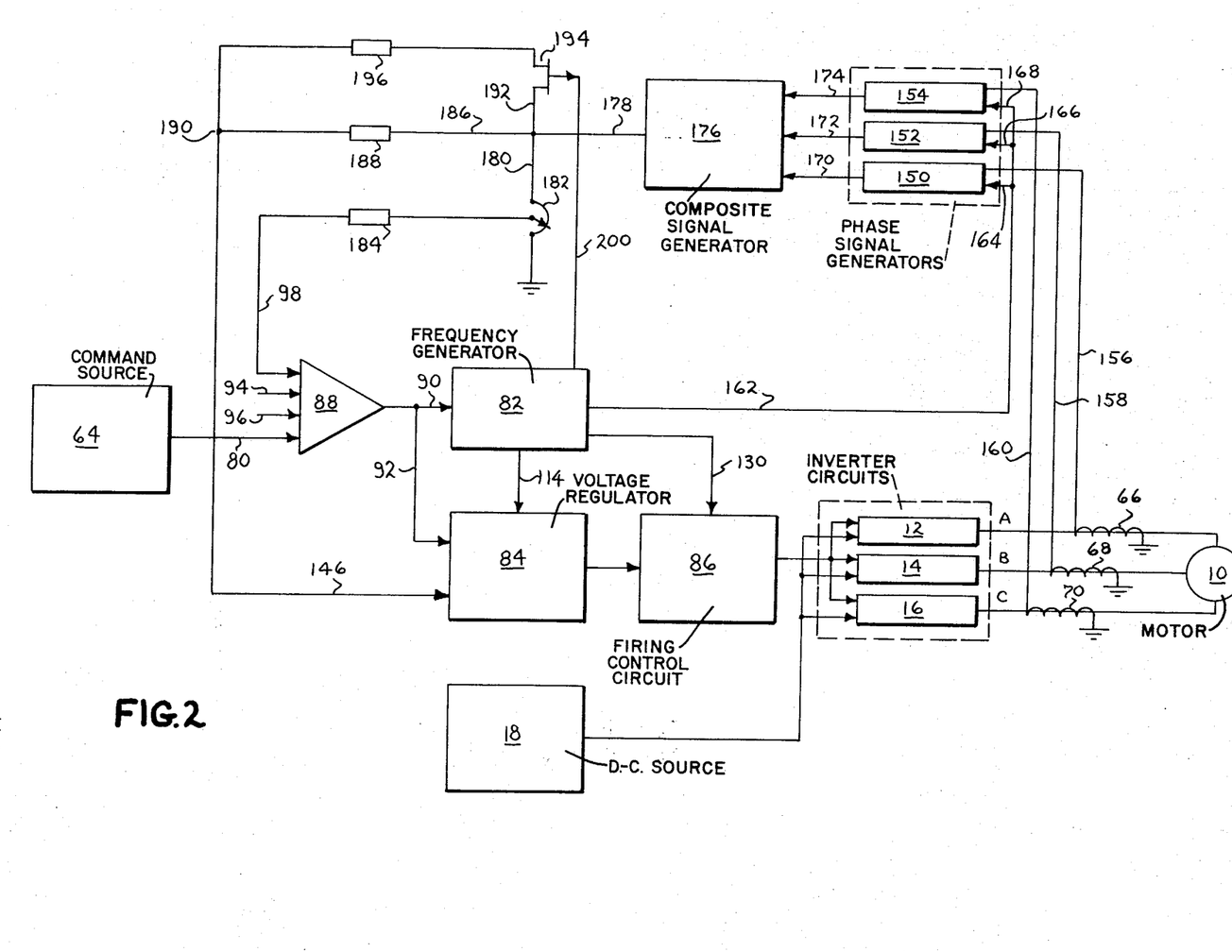
FIG. 2 is a one line block diagram of the control means for the drive system of FIG. 1.

The control apparatus 54 will now be considered in greater detail with reference to the block diagram of FIG. 2. The control system responds to a command signal from the command source 64, the command signal representing a desired performance level for the load motor 10. This command signal, which is coupled to the control system through a conductor 80, is used along with other signals to determine the fundamental frequency of the alternating current electric power which is applied to the motor 10, the time-ratio-controlled switching or chopping frequency, and the ratio of the "on" and "off" times for time-ratio-controlled regulation of the output voltage level. The output frequency and the chopping frequency of the inverter are determined by a frequency generator 82. A time-ratio-control regulating circuit 84 determines the output voltage level of the inverter circuit by determining the relative "on" and "off" times of the load-current carrying controlled rectifiers. A rectifier firing control circuit 86 responds to both the frequency generator 82 and to the TRC regulating circuit 84 to fire the appropriate load and commutating controlled rectifiers in accordance with the outputs of the generator 82 and the regulating circuit 84.

The command signal can be obtained from any source 64 which is convenient for indicating the desired output of the inverter system. For example, it can be obtained from the slide-wire of a potentiometer which is biased by a regulated power supply, with the position of this slide-wire varied in accordance with the desired speed of a motor drive. The command signal might also be obtained from the output of a computer or from a tachometer driven by a master drive of a multi-drive system or from other sources. The command signal is coupled through a command amplifier 88 to conductors 90 and 92 which lead to the frequency generator 82 and the TRC regulating circuit 84, respectively.

The output of the command amplifier 88 may be affected not only by the command signal, but also by various other signals including a current limit signal such as that from conductor 94 or by regeneration limit signal at conductor 96. The current limit signal at the conductor 94 comprises a signal which indicates during motoring or regenerating operation that the level of the actual current flowing in the motor 10 is above a preselected level, such as 150% of the rated current level, the polarity of the signal being such that it tends to modify the command signal to reduce the speed at which the motor is operating during motoring operation and increase the speed during regeneration. The regeneration limit signal at the conductor 96 comprises a signal which indicates during regenerative operation that the inverter control system is feeding more power back to the D-C source than it is capable of absorbing, the polarity of the signal being such that it tends to modify the command signal to increase the frequency of the inverter so as to cause the motor to decelerate more slowly as it is returning power back to the D-C source. In accordance with the present invention, a signal indicative of motor torque and slip is also supplied to the amplifier 88 over conductor 98. The manner in which this signal is generated and utilized will be described in detail at a later point in this description.

The general mode of operation of the frequency generator 82, the time-ratio-control regulating circuit 84, and the rectifier firing control circuit 86 will now be described with reference to FIG. 3. The output frequency of the inverter is determined by a voltage controlled oscillator 100 of the frequency generator 82 in response to the output signal level of the command amplifier 88. As explained above, the output of this command amplifier 88 is determined by the level of the command signal modified by the signals on conductors 94, 96 and 98. The voltage controlled oscillator 100 comprises any one of a plurality of well-known highly stable oscillators of the voltage controlled type which produces an output frequency which is some multiple of the actual output frequency of the inverter circuit. In a three-phase embodiment of the invention, the oscillator output is conveniently selected to be a square wave having a frequency ninety-six times the desired output frequency.

The output from the oscillator 100 is coupled through a conductor 102 to a frequency divider 104 comprising individual flip-flop stages 106, 108, 110 and 112 for dividing the output frequency of the oscillator 100 by two, four, eight and sixteen respectively. By "flip-flop," a conventional electronic logic element is meant which has two stable electronic states which occur alternately upon the receipt of a plurality of successive input signals from the oscillator 100. The connections of such elements to accomplish the indicated simple divisions by two are well known to those skilled in the art.

The outputs from the frequency divided 104 are shown for schematic purposes to be connnected to a conductor 114 leading to the TRC regulating circuit 84. The TRC regulating circuit 84 selects which of the output signals from the frequency divided 104 it requires to provide the proper time-ratio-controlled chopping frequency for the inverter. In the preferred embodiment illustrated, the command frequency signal is supplied via conductor 92 to a synchronising selector 116 and the selection of chopping frequency multiple depends upon the magnitude of the inverter frequency. The highest multiple, forty-eight, is used from line 118 at the lowest inverter frequency of operation, and the lowest multiple, six, is used from line 120 at the highest frequency of operation. The multiples selected determine the number of TRC operations during a given full cycle period of operation of the inverter. It will be appreciated that the maximum reliable switching speed of the switching devices puts an upper limit on the number of TRC operations that can be performed. Also wave shape is a factor favoring higher multiples and, conversely, conservation of commutation energy favors lower multiples.

A three-phase generator 122 may comprise any convenient device, as a shift register, which receives an input signal each time the voltage of one of the output phases A, B and C is to change its polarity at the end of one-half cycle of the output voltage for this phase and the beginning of a second half-cycle of this voltage. Since there are three output phase which are displaced by 120 electrical degrees and since the voltage at each of these phases remains at one polarity for 180 electrical degrees and then switches to the opposite polarity for 180 electrical degrees, it follows that three-phase generator 122 changes state every 60 electrical degrees or six times during any 360 electrical degree interval.

Figure 3:
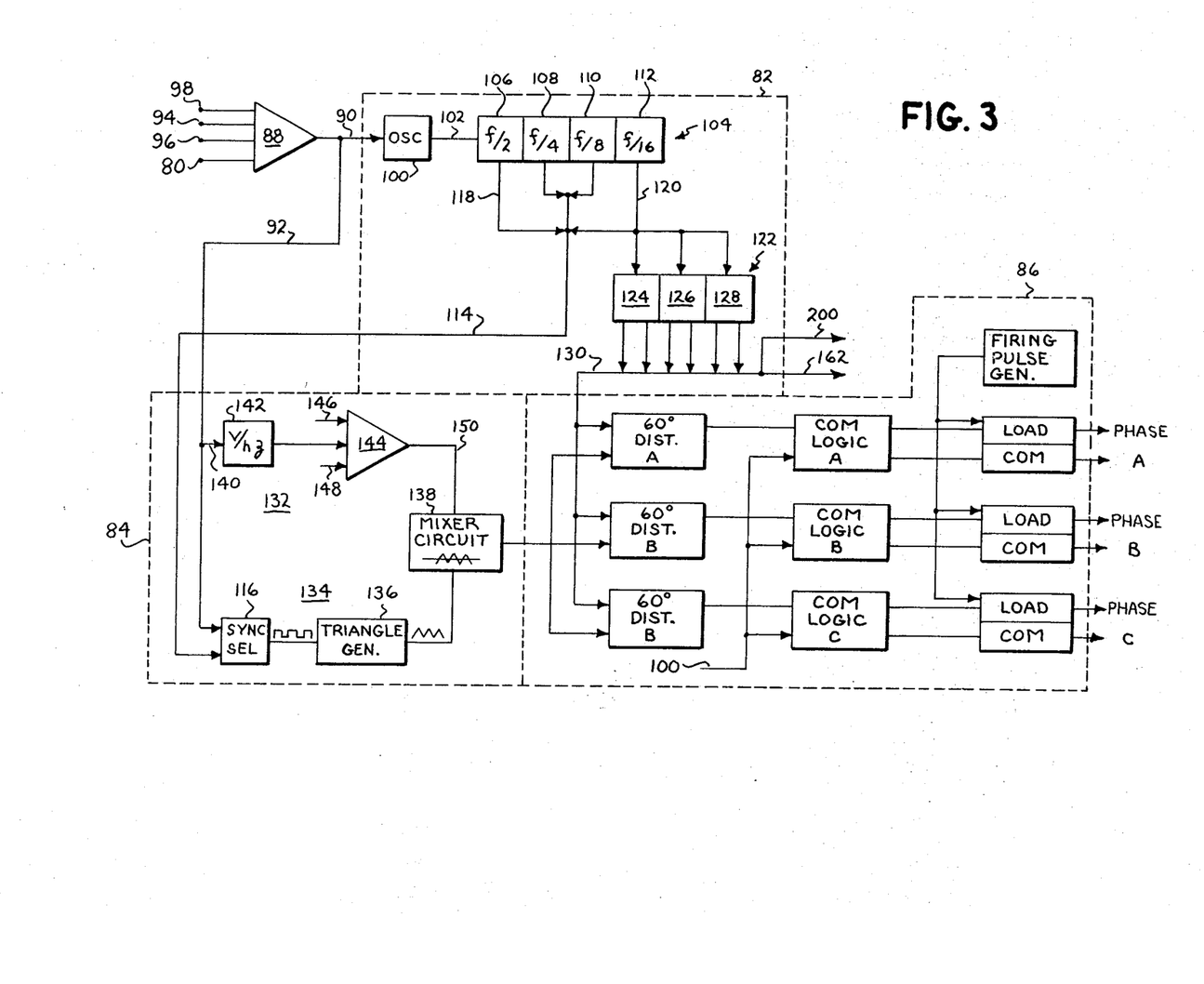
FIG. 3 is a more detailed block diagram of portions of the control means of FIG. 2.

The three-phase generator 122 shown in FIG. 3 comprises three flip-flops 124, 126 and 128, each of which receives the input signals from a conductor 120 which is connected to the output of the flip-flop 112. The flip-flops are interconnected in a ring such that each time a pulse is received from the flip-flop 112 of the frequency divider 104 only one of the flip-flops of the three-phase generator 122 operates. The result is a rectangular or square waveform for each plane that alternates in polarity in phase with the phase voltage and is related to the other phase waveforms in a manner analogous to the customary polyphase power supply featuring sine waveforms. The manner of interconnecting flip-flops of this type to obtain the desired sequential operation is well known to those skilled in the art and thus will not be described in detail.

For schematic purposes, the signals from the phase generator 122 are shown as being conducted through a conductor 130 to the rectifier firing controlled circuit 86 where the phase signals are distributed to the three output phases. Suffice it to say that the flip-flop 128 produces output signals corresponding to Phase A while the flip-flop 126 produces output signals corresponding to Phase B and the flip-flop 124 produces output signals corresponding to Phase C. The interconnections of the three-flip-flops in the three-phase generator can be switched to provide for motor reversing.

The TRC regulating circuit 84 responds to the output of the command amplifier 88 to determine the output voltage level of the inverter circuit by selecting the chopping frequency of the inverter and determining the "on" and "off" times of the load-current carrying controlled rectifiers. The output of the command amplifier 88 is coupled through the conductor 92 to two channels of the TRC regulating circuit 84; one channel 132 develops a voltage reference signal and the other channel 134 develops a triangular shaped chopping frequency signal, by feeding a synchronous rectangular waveform from synchronous selector 116 to a triangle generator 136 that can be an integrating amplifier, for example. The voltage reference and the triangle voltage are compared in a mixer circuit 138, and at the intersection of these two voltages, signals are developed to control the "on" and the "off" times of the chopping which occurs in the output of the inverter circuit, such that the chopping frequency is always synchronized with the inverter frequency.

The conductor 92 connects the output of the command amplifier 88 to the voltage reference channel 132 by way of a conductor 140. The voltage reference channel basically comprises a voltage per hertz compensating network 142 that can be a resistance voltage divider, for example, that conveniently includes an adjustable potentiometer for varying the proportion of voltage received at input 140 which appears at the output of network 142. Amplifier 144 compares the output from the volts per hertz network 142 with feedback signals from conductors 148 and 146 that are proportional to average motor voltage and load, respectively. The output from the amplifier 144 comprises the voltage reference signal which is coupled through a conductor 150 to the mixer circuit 138.

Referring now to FIGS. 2 and 3, it will be noted in accordance with the previous discussion that a signal indicative of motor torque and slip is supplied to the command amplifier 88 over conductor 98 and that a signal indicative of motor load is supplied to the implifier 144 of the TRC regulating circuit 84 over conductor 146. The present invention is primarily concerned with the manner by which these signals are generated and supplied to the amplifier 88 and the amplifier 144, the basic operation of the control system as just described being covered by the aforesaid patent applications. For a more detailed coverage of the operation of the basic control system, reference may be had to the aforesaid patent applications.

For an understanding of the mechanism by which the signals indicative of motor torque and load are generated in accordance with the present invention, attention is now directed to FIG. 2. As shown therein, current transformers 66, 68 and 70 are coupled with the conductors supplying current to Phases A, B and C, respectively, of the motor 10 to continuously monitor the actual current flow in each respective phase. Current flow proportional to the actual phase current is generated in the secondary of each current transformer and supplied therefrom to a respective one of three-phase control signal generators 150, 152 and 154. More particularly, a current signal proportional at all times to the actual current flow in Phase A is supplied to the phase control signal generator 150 from the transformer 66 over conductor 156. A similar signal proportional to the actual current in Phase B is supplied over conductor 158 to the phase control signal generator 152, and a similar signal proportional to the actual current in Phase C is supplied over conductor 160 to the phase control signal generator 154. The phase control signal generators 150, 152 and 154 are also supplied over the multichannel line 162 and conductors 164, 166 and 168 with signals in phase with the voltage of the respective phases. These signals are conveniently supplied from the three-phase generator 122 of the frequency generator 82 (see FIG. 3). Since the motor 10 is an inductive load, the voltage signals supplied over conductors 164, 166 and 168 and the current signals supplied over conductors 156, 158 and 160 are normally out of phase relative to each other, and the function of the phase control signal generators 150, 152 and 154 is to produce in response to these input signals phase control signals on output conductors 170, 172 and 174, respectively, which have an average magnitude proportional to the average magnitude of the component of actual current which is in phase with the voltage. The phase control signals for the three phases A, B and C are then supplied over the output conductors 170, 172 and 174 to a composite control signal generator such as a summing amplifier 176 where the individual phase control signals are summed to produce a composite control signal on conductor 178, this signal being proportional to motor torque and slip. This signal is supplied through conductor 180, an adjustable resistance 182, a fixed resistance 184, and conductor 98 to the command amplifier 88, the function of the resistance being to adjust the signal level to that required at the conductor 98 of the control system. The composite control signal on conductor 178 is also supplied through conductor 186 and a resistor 188 to a summing junction 190 and through conductor 192, a field effect transistor (FET) 194, and a resistor 196 to the summing junction 190. The summed signal at junction 190 is then supplied over conductor 146 to the amplifier 144 (see FIG. 3) of the TRC regulating circuit 84. The signal supplied to the junction 190 from the resistor 188 is proportional to the load component of motor current and represents the amount of IR compensation required to maintain constant excitation voltage in the motor 10. The signal supplied to the junction 190 from the resistor 196 is proportional to both the load component of motor current and the fundamental frequency of the inverter since the conductance of the FET transistor 194 is controlled by signals supplied from the three-phase generator 122 of the frequency generator 82 (see FIG. 3) over conductor 200 to the base of the FET transistor 194. The signal supplied from the resistor 196 to the junction 190 represents the amount of IX compensation required to maintain constant excitation voltage in the motor 10. The summed signal supplied over conductor 146 represents the amount of stator IZ drop due to motor load current and thus is the amount of IZ compensation required for maintaining constant excitation voltage.

The slip compensation signal supplied to the command amplifier 88 and the IZ compensation signal supplied to the TRC regulating circuit 84 over conductors 98 and 146, respectively, require for their generation a signal having an average magnitude proportional to the average magnitude of the components of actual current in phase with the phase voltages. In accordance with this invention, such a signal is generated by the phase control signal generators 150, 152 and 154 and the summing amplifier 176. A preferred embodiment for generating phase control signals and a composite signal in accordance with this invention is illustrated by FIG. 4.

Figure 4:
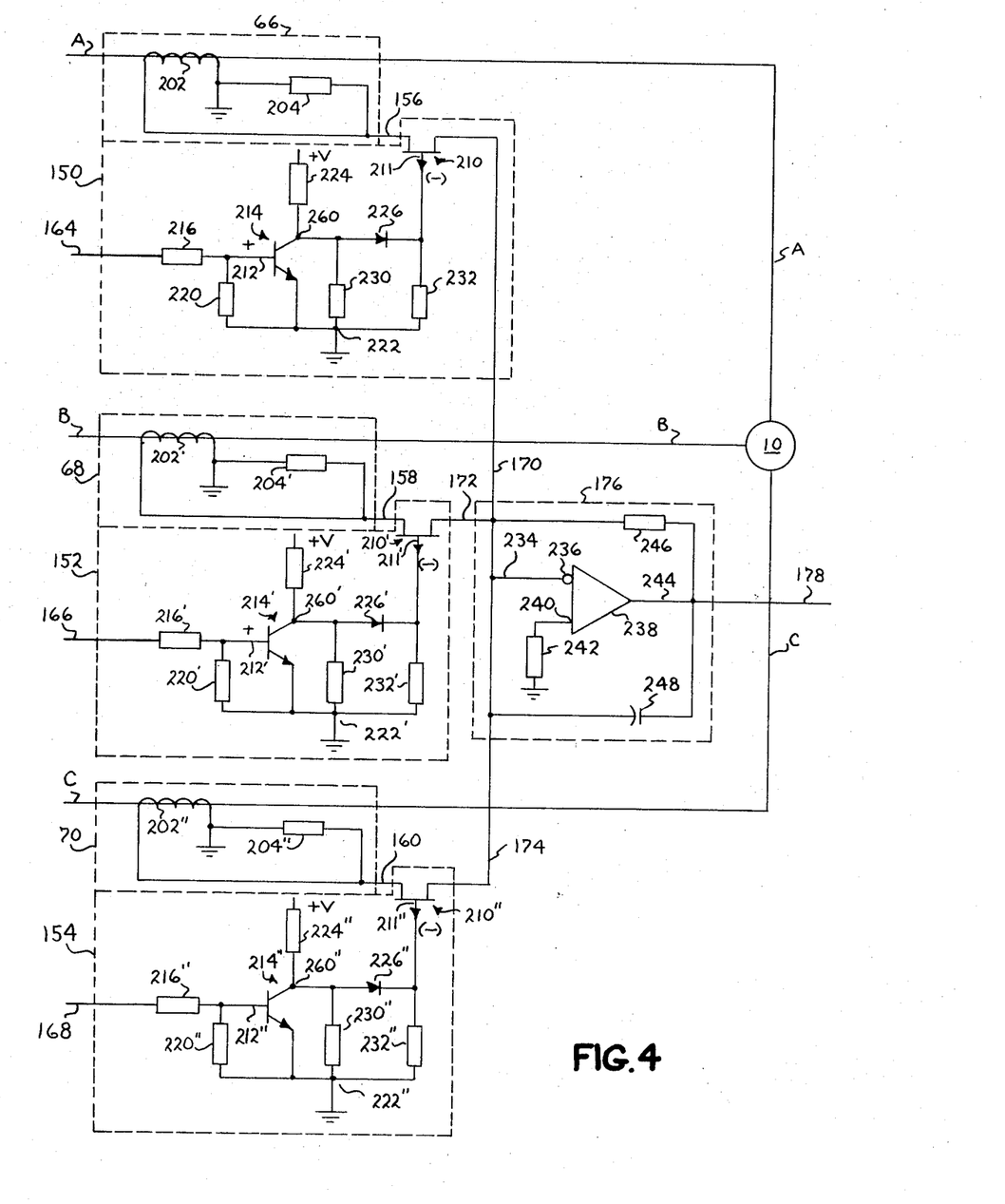
FIG. 4 is a schematic circuit diagram of a preferred embodiment of the means utilized in accordance with the invention for generating and summing the phase control signals to produce the composite control signal.

Referring now to FIG. 4, the three phase control signal generators 150, 152 and 154 are illustrated, each being connected by the respective conductors 156, 158 and 160 to the respective current transformer 66, 68 and 70. Current signals proportional to the actual phase current in Phases A, B and C are supplied over the conductors 156, 158 and 160, respectively. Since the current transformers are structurally identical, only transformer 66 will be described in detail, the similar parts of transformers 68 and 70 being illustrated by primed and double primed numerals. Similarly, only phase control signal generator 150 will be described in detail with the parts of generators 152 and 154 also illustrated by primed and double primed numerals. The transformer 66 includes a secondary winding 202 within which a current proportional to the actual current in Phase A is generated, the current generated in the winding 202 being supplied on conductor 156 to the phase control signal generator 150. To prevent the creation of possibly hazardous voltages, a resistor 204 is connected in parallel across the winding 202.

The phase control signal generator 150 will now be described. The conductor 156 for supplying the actual phase current signal to the phase control signal generator 150 is connected to a field effect transistor (FET) 210 at either its source or drain electrode. Since the field effect transistor 210 is bi-directional with respect to its current path through the source-drain electrodes, the conductor 156 may be connected to either of the two, the conductor 170 to the summing amplifier being connected to the other electrode. The conductor 164 introduces into the phase control signal generator 150 a rectangular or square wave voltage signal in phase with the voltage of output Phase A of the power conversion circuit 12 of FIGS. 1 and 2. As shown in FIG. 4, the voltage signal on conductor 164 is coupled to the base electrode 212 of a conventional NPN type transistor 214 by a resistor 216. A resistor 220 is connected to the gate electrode 212 of the transistor 214 as well as to a ground or common point 222 to stabilize the voltage level of the gate electrode when no voltage signal is present on the conductor 164. The collector electrode of the transistor 214 is coupled through a resistor 224 to a positive bias voltage and through a diode rectifier 226 to the gate of FET 210 and through yet another resistor 230 to the ground or common point 222. The gate of the FET 210 is also connected through a resistor 232 to the common point 222.

FIG. 4 also shows the summing amplifier 176 in detail. An input lead 234 to the summing amplifier 176 serves to sum the phase current signals and to introduce the summation thereof into an inverting input 236 of an operational amplifier 238. A non-inverting input 240 of the amplifier 238 is coupled by a resistor 242 to ground or common point 222. In parallel with the amplifier 238 between the input lead 234 thereto and its output conductor 244 are a gain-setting resistor 246 and a filter capacitor 248.

The operation of the phase control signal generators 150, 152 and 154 will now be described with particular emphasis on the generator 150. As previously explained, an electrical signal continuously proportional to the actual current in Phase A is supplied to the FET 210 by conductor 156, and an electrical signal in phase with the voltage of Phase A is supplied on conductor 164. As will be appreciated from the previous discussion concerning the manner by which the voltage signal is produced by the three-phase generator 122 (FIG. 3), the voltage signal on conductor 164 is a square wave signal. As long as the transistor 214 is turned off, the positive voltage applied to the resistor 224 is sufficient to maintain the FET 210 in a non-conductive state by applying a positive voltage to its base 211. As long as the FET 210 is non-conductive, there will be an absence of a signal on conductor 170 to the summing amplifier 176.

When, however, the voltage signal applied on conductor 164 changes from the relatively negative half-cycle to its relatively positive half-cycle, the positive voltage at the base 212 will be sufficient to turn on the transistor 214, thereby causing the voltage at junction 260 to drop to approximately that of common point 222. As a result, the voltage at the base 211 of the FET 210 drops sufficiently to turn on the FET 210, and the current signal supplied on conductor 156 is passed to the conductor 170 and the summing amplifier 176 by the FET 210. The FET 210 will remain conductive so long as the voltage signal supplied on conductor 164 is relatively positive. When it drops to its relatively negative level at the end of the positive half-cycle, the transistor 214 will immediately turn off and thereby turn off the FET 210. It will thus be appreciated that the actual current signal on conductor 156 is conducted to the summing amplifier 176 during the full positive half-cycles of the voltage signal, but not during the negative half-cycle.

Since the motor 10 is an inductive load, the actual current in Phase A will not be in phase with the voltage of Phase A. Accordingly, the signal supplied to conductor 170 by the bi-directional FET during the positive half-cycle of voltage will be negative for a portion of the conductive time and positive during a portion of the conductive time. At a given instant, the phase control signal to conductor 170, whether it is negative or positive, will be proportional to the actual current in Phase A at that instant. Over the entire positive half-cycle of voltage, the phase control signal will have an average magnitude proportional to the average magnitude of the component of actual phase current which is in phase with the voltage. As long as the actual phase voltage and current are symmetrical and attain equal positive and negative levels, the average magnitude of the phase control signal over a full cycle will be proportional to the average magnitude of the in-phase component of actual current.

Phase control signal generators 152 and 154 operate in a manner identical to that of generator 150 to produce on conductor 172 an electrical phase control signal proportional during the positive half-cycle of Phase B voltage to the average magnitude of the component of actual Phase B current which is in phase with the voltage and to produce on conductor 174 an electrical phase control signal proportional during the positive half-cycle of Phase C voltage to the average magnitude of the in-phase component of Phase C current. These signals are summed at conductor 234 and are thus supplied to the inverting amplifier 238 of the summing amplifier 176 as an electrical signal proportional to the average of the three in-phase components of actual current. Since at least one phase will have positive voltage at all times, the signal supplied to the amplifier 238 will be continuous even though signals will be present on any one of the conductors 170, 172 and 174 only half of the time.

As indicated previously, the amplifier 238 inverts and amplifies the signal on conductor 234 to generate a composite control signal on conductor 178, the composite control signal being proportional to motor slip and torque. This signal is then utilized as previously explained and illustrated by FIGS. 2 and 3 to provide a signal proportional to motor slip to the command amplifier 88 over conductor 98 and a signal proportional to motor load to the amplifier 144 over conductor 146. The magnitude and polarity of the signal on conductor 98 is such that for the motoring mode of operations, the fundamental frequency of the power conversion apparatus is increased in response to increased slip and reduced in response to decreased slip. During regeneration where the load component of motor current is out of phase with the motor voltage, the fundamental frequency of the power conversion apparatus is decreased in response to increased slip. Similarly, the magnitude and polarity of the signal on conductor 146 is such that for motoring the average voltage is increased in response to increased load and for regeneration the average voltage is decreased in response to increased load. In this manner, substantially constant operating speed and excitation voltage are maintained.

Although this invention has been described in connection with a preferred embodiment, it will occur to those skilled in the art that many modifications and variations are possible without departing from the spirit and scope of the invention. For example, if the voltage and current in the phases are not symmetrical and do not have substantially equal positive and negative values, it will be desirable to obtain phase control signals over full cycles rather than over only half-cycles. It will readily occur to those skilled in the art that modifications can be made to obtain full cycle phase control signals through the use of more than one FET or equivalent devices for each phase. Similarly, it will be obvious that the phase control signal for one phase only can be used as an indication of motor torque and slip where the phase loads are reasonably balanced. In such a case, however, particularly where a half-cycle only is sampled, it will be desirable to utilize suitable filtering circuitry to smooth out the resulting waveform. Accordingly, it is intended that these and other modifications of the invention be included within the scope of the appended claims.

What is claimed as new and is desired to secure by Letters Patent of the United States is:

1. An A-C adjustable speed drive system comprising:
a polyphase A-C motor,
static power conversion means for changing unidirectional electric power to polyphase electric power, said conversion means including a plurality of output phases each connected to a respective phase of said motor and switching means for controlling current flow in each of the output phases,
a plurality of means each coupled to sense the actual current in a respective output phase and produce an electrical signal proportional thereto,
means for producing a plurality of voltage signals each of which is in phase with the voltage of a respective output phase, there being at least one of the signals in phase with the voltage of each output phase,
a plurality of phase control signal gating means each having inputs coupled to said voltage and current sensing means of a respective output phase and being responsive to a predetermined polarity of the voltage signal to provide an electric phase control signal having an instantaneous magnitude of the actual current in the respective output phase during the interval when said input voltage signal has said predetermined polarity and an average magnitude proportional to the average magnitude of the component of actual current in said phase which is in phase with the voltage of said phase,
and control means including summing means coupled to each of said phase control signal gating means for summing the phase control signals to produce a composite control signal and means responsive to the composite control signal to vary the fundamental frequency and the average voltage of the polyphase power output of said power conversion means by time-ratio-controlled switching of said switching means in response to variations in the composite control signal,
said control means further comprising means for converting said composite control signal into a first signal component proportional to said composite control signal and a second signal component proportional to both said composite control signal and the fundamental frequency and means for summing said first and second signal components, said control means being responsive to increases in the summed signal to adjust the time-ratio-controlled switching to increase the average voltage and being responsive to decreases in the summed signal to adjust the time-ratio-controlled switching to decrease the average voltage during motoring operation, and to decrease the average voltage with increasing load and to increase the average voltage with decreasing load during regenerating operation.

2. A drive system as defined by claim 1 in which said control means further comprises:
means responsive to a command signal indicative of a desired level of motor performance and to at least one other signal including the composite control signal to generate a corrected control signal,
and means responsive to said corrected control signal to maintain a substantially constant motor speed in response to a constant command signal by varying the fundamental frequency of the polyphase power output.

3. An A-C adjustable speed drive system comprising:
a polyphase A-C motor,
static power conversion means for changing unidirectional electric power to polyphase electric power, said conversion means including a plurality of output phase each connected to a respective phase of said motor,
a plurality of means each coupled to sense the actual current in a respective output phase and produce an electrical signal proportional thereto,
means for producing a plurality of voltage signals each of which is in phase with the voltage of a respective output phase, there being at least one of the signals in phase with the voltage of each output phase, a plurality of phase control signal gating means each comprising input means connected to a respective one of said current sensing means, output means, control input means connected to said voltage signal producing means, and only a bi-directional conductive path between said input means and said output means, said bi-directional conductive path being conductive only when a voltage signal of said predetermined polarity is supplied to said control input means such that the current signal supplied to said input means is transmitted to said output means as a phase control signal during periods of conductance, the phase control signal having an instantaneous magnitude proportional to the actual current in the respective output phase during the interval when said input voltage signal has said predetermined polarity and an average magnitude proportional to the average magnitude of the component of actual current in said phase which is in phase with the voltage of said phase, and control means for controlling the voltage output of said power conversion means, said control means including summing means coupled to said output means of each of said phase control signal gating means for summing the phase control signals to produce a composite control signal and means responsive to the composite control signal to vary the voltage output of said power conversion means in response to variations in the composite control signal.

4. A drive system as defined by claim 3 in which said bi-directional path includes a single field effect transistor, said input means and said output means connected to respective ones of the drain and source electrodes of said field effect transistor and the gate of said field effect transistor connected to said control input means, said control input means rendering said field effect transistor conductive when a voltage signal of a predetermined polarity is supplied to said control input means.

5. A drive system as defined by claim 4 in which each of said means for sensing the actual current and producing a signal proportional thereto comprises current transforming means, the respective output phase of the static power conversion means being connected in series with the primary winding of said current transforming means and the secondary winding being connected to the input means of said field effect transistor, the current generated in the secondary winding and supplied to said field effect transistor being proportional to the actual current in the respective output phase.

References Cited

UNITED STATES PATENTS

| | | | |
|---|---|---|---|
| 3,512,067 | 5/1970 | Landau | 318—230 X |
| 3,372,323 | 3/1968 | Guyeska | 318—231 X |
| 3,441,823 | 4/1969 | Schlabach | 18—227 X |
| 3,593,083 | 7/1971 | Blaschke | 318—230 X |
| 3,619,749 | 11/1971 | Schieman | 318—231 |
| 3,611,089 | 10/1971 | Mokrytzki | 318—227 |
| 3,619,750 | 11/1971 | Mokrytzki | 318—227 |

GENE Z. RUBINSON, Primary Examiner

U.S. Cl. X.R.

318—230, 231